United States Patent [19]

Larson et al.

[11] 3,937,914

[45] Feb. 10, 1976

[54] METHOD AND APPARATUS FOR MANUFACTURING WELDED METAL TUBES OF FINITE LENGTH

[75] Inventors: George T. Larson, Port Chester, N.Y.; Richard Hartmann, Jr., Trumbull, Conn.

[73] Assignee: Thermatool Corporation, Stamford, Conn.

[22] Filed: Aug. 2, 1974

[21] Appl. No.: 494,035

[52] U.S. Cl. .................................. 219/67; 219/59
[51] Int. Cl.² ........................................ B23K 31/06
[58] Field of Search ............ 219/59, 64, 65, 67, 97, 219/101

[56] References Cited
UNITED STATES PATENTS

| | | | |
|---|---|---|---|
| 1,872,287 | 8/1932 | Heineman | 219/67 |
| 2,578,832 | 12/1951 | Pearson et al. | 219/59 |
| 3,088,020 | 4/1963 | Cooper et al. | 219/97 |
| 3,591,757 | 7/1971 | Rudd | 219/67 |

FOREIGN PATENTS OR APPLICATIONS 1,021,687  12/1957  Germany ..................... 219/64

*Primary Examiner*—Elliot A. Goldberg
*Assistant Examiner*—N. D. Herkamp
*Attorney, Agent, or Firm*—Brooks Haidt Haffner & Delahunty

[57] ABSTRACT

Methods and apparatus for manufacturing welded metal tubes of finite length in which an almost complete, axially split tube is advanced into a welding head where one edge face at one side of the split is accurately positioned and clamped and then the other edge face at the opposite side of the split is pressed against the one edge face. The welding head comprises a retractable edge face guide for said one edge face, clamping devices for holding and applying pressure to the tube, a proximity conductor over and extending along the abutting edge faces and contacts engagable with the opposite ends of the tube adjacent the abutting edge faces and connected to a high frequency current source for electrically heating the metal adjacent the edge faces to forge welding temperature.

9 Claims, 20 Drawing Figures

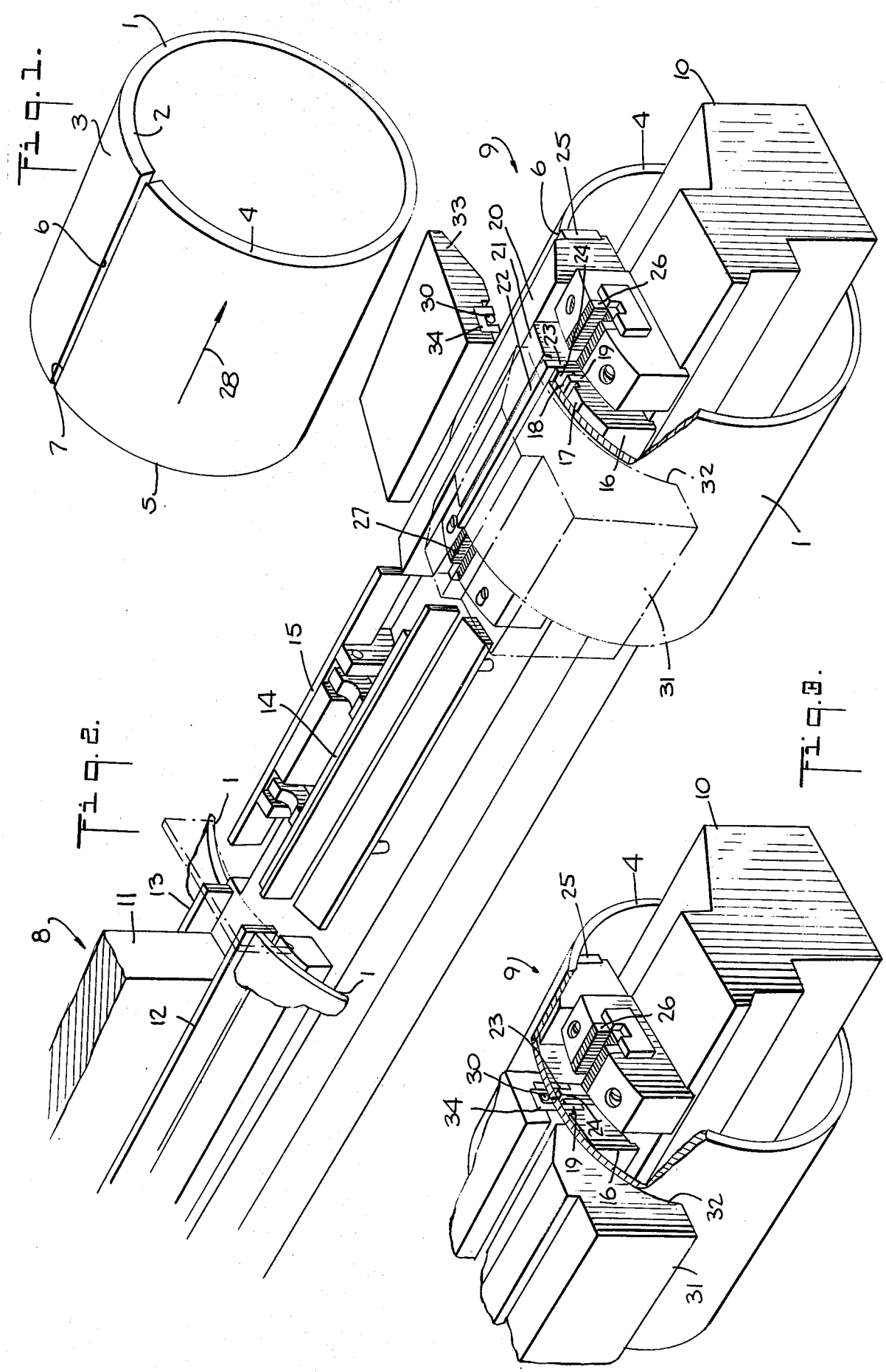

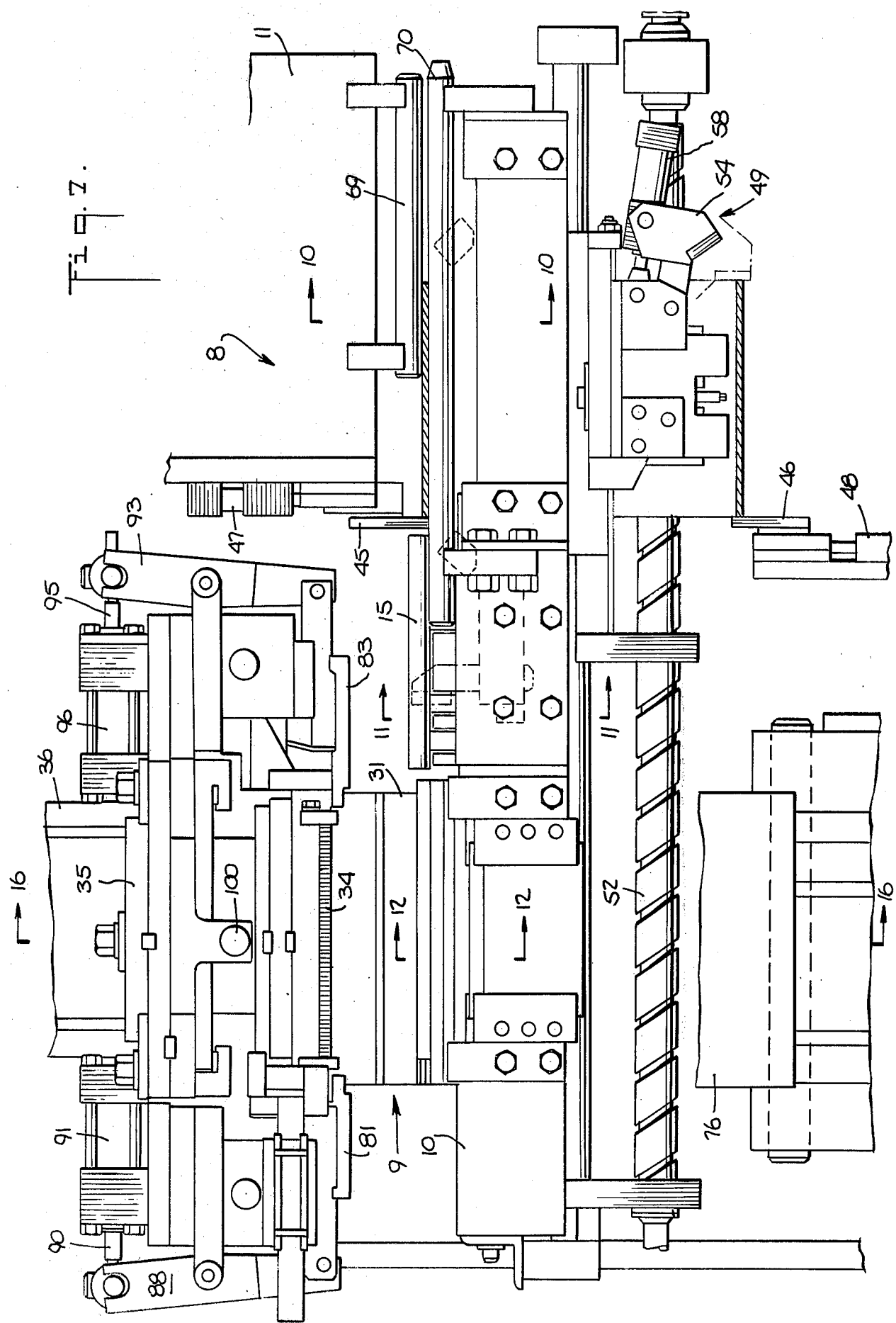

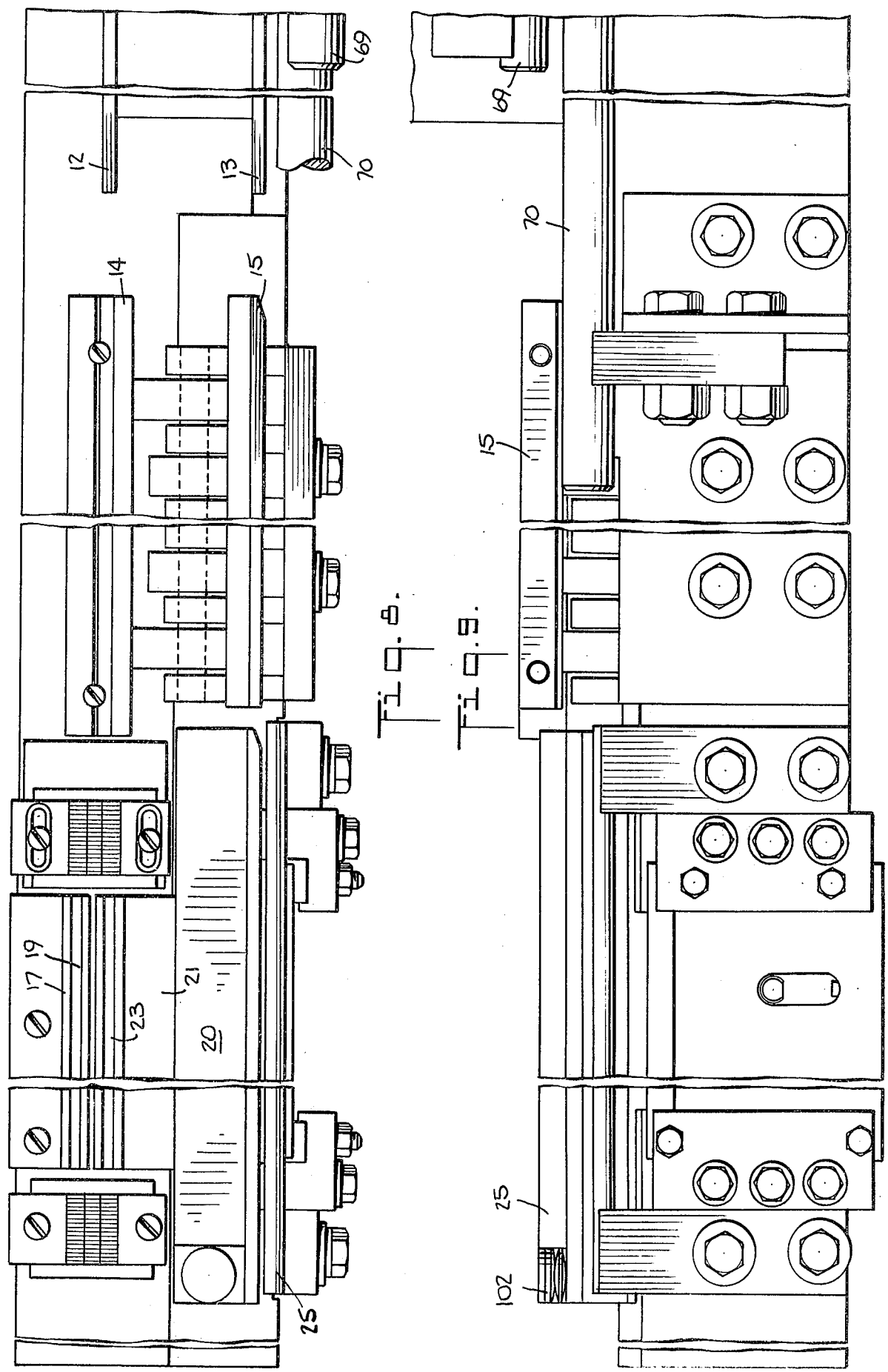

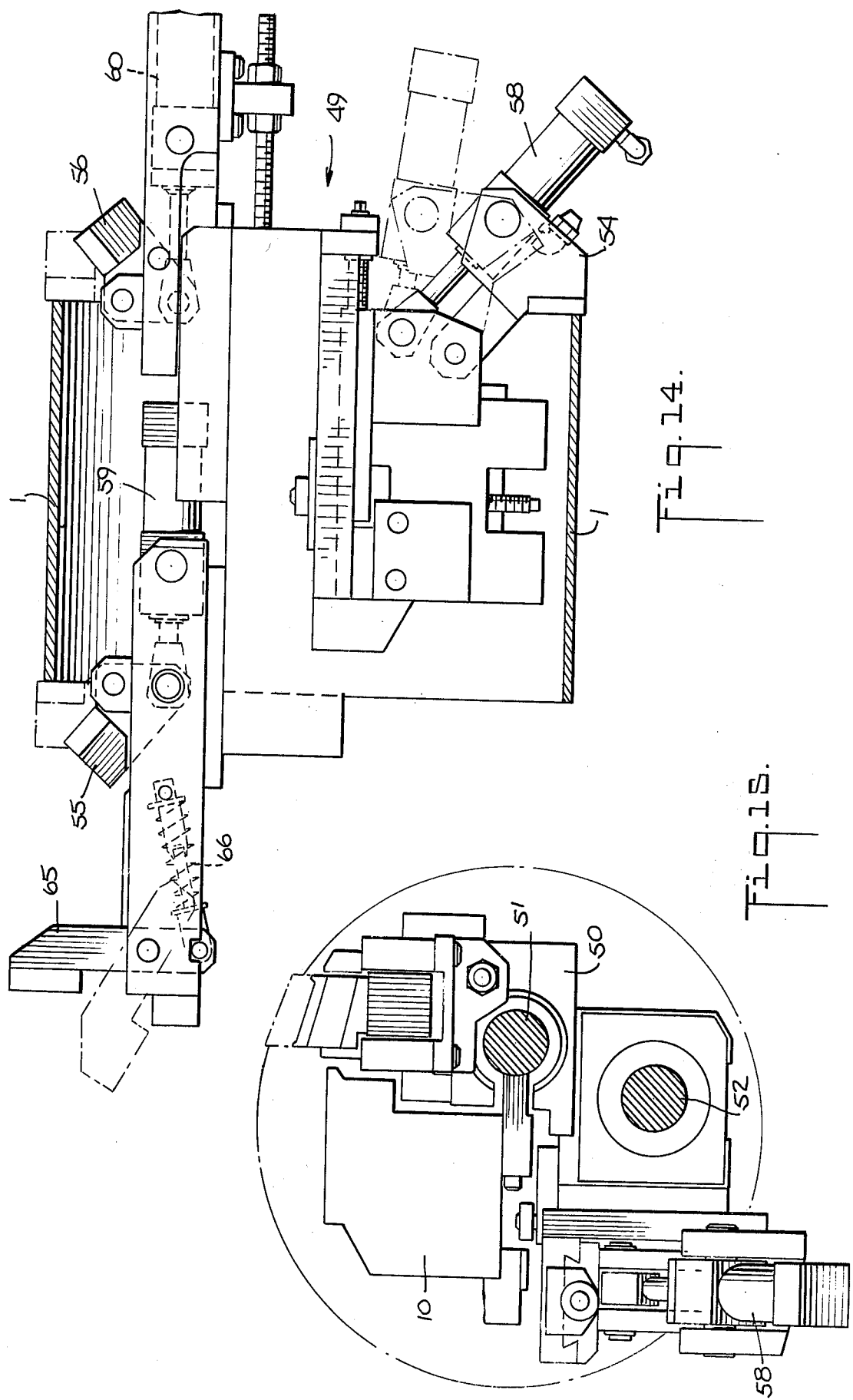

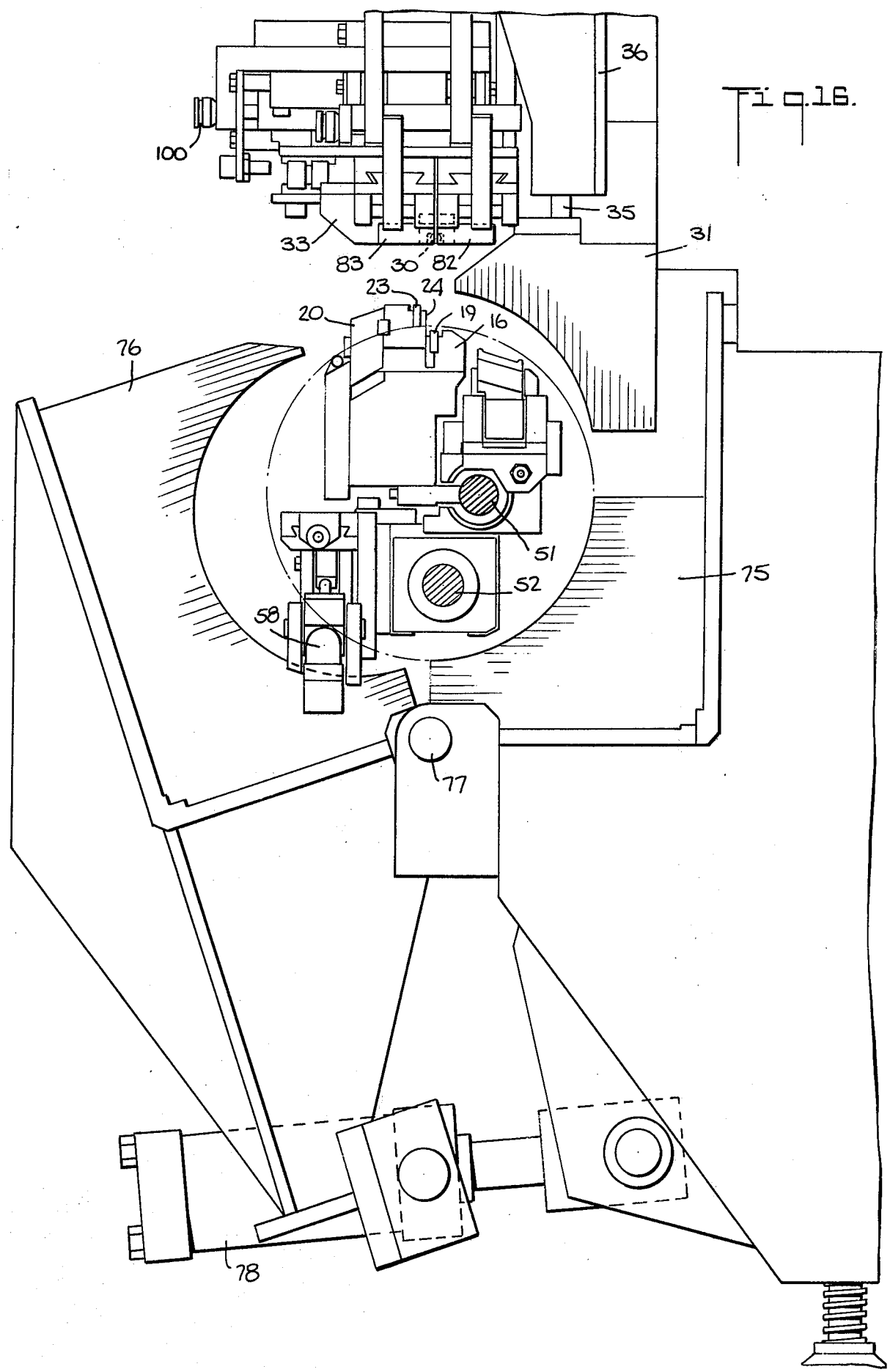

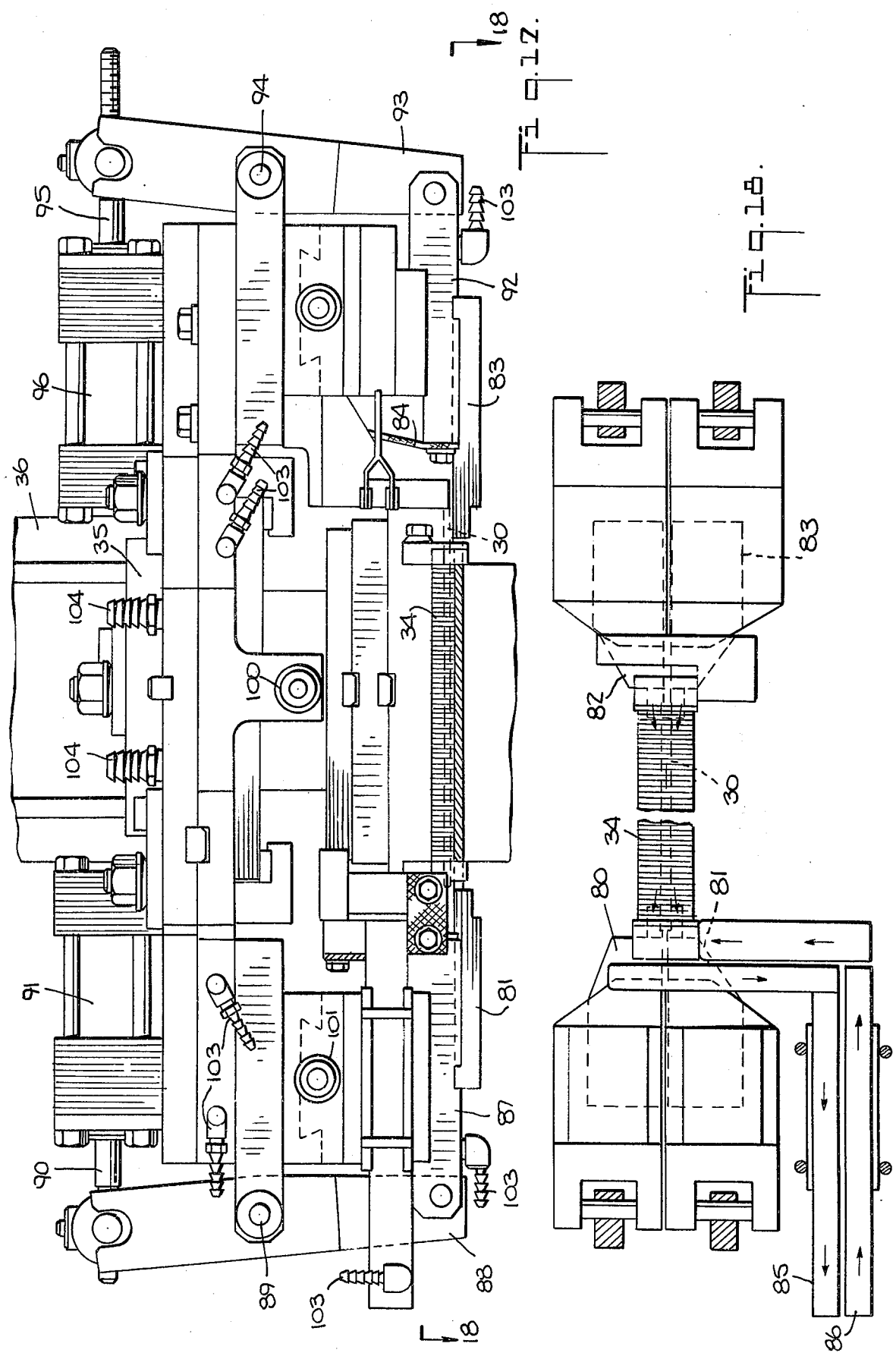

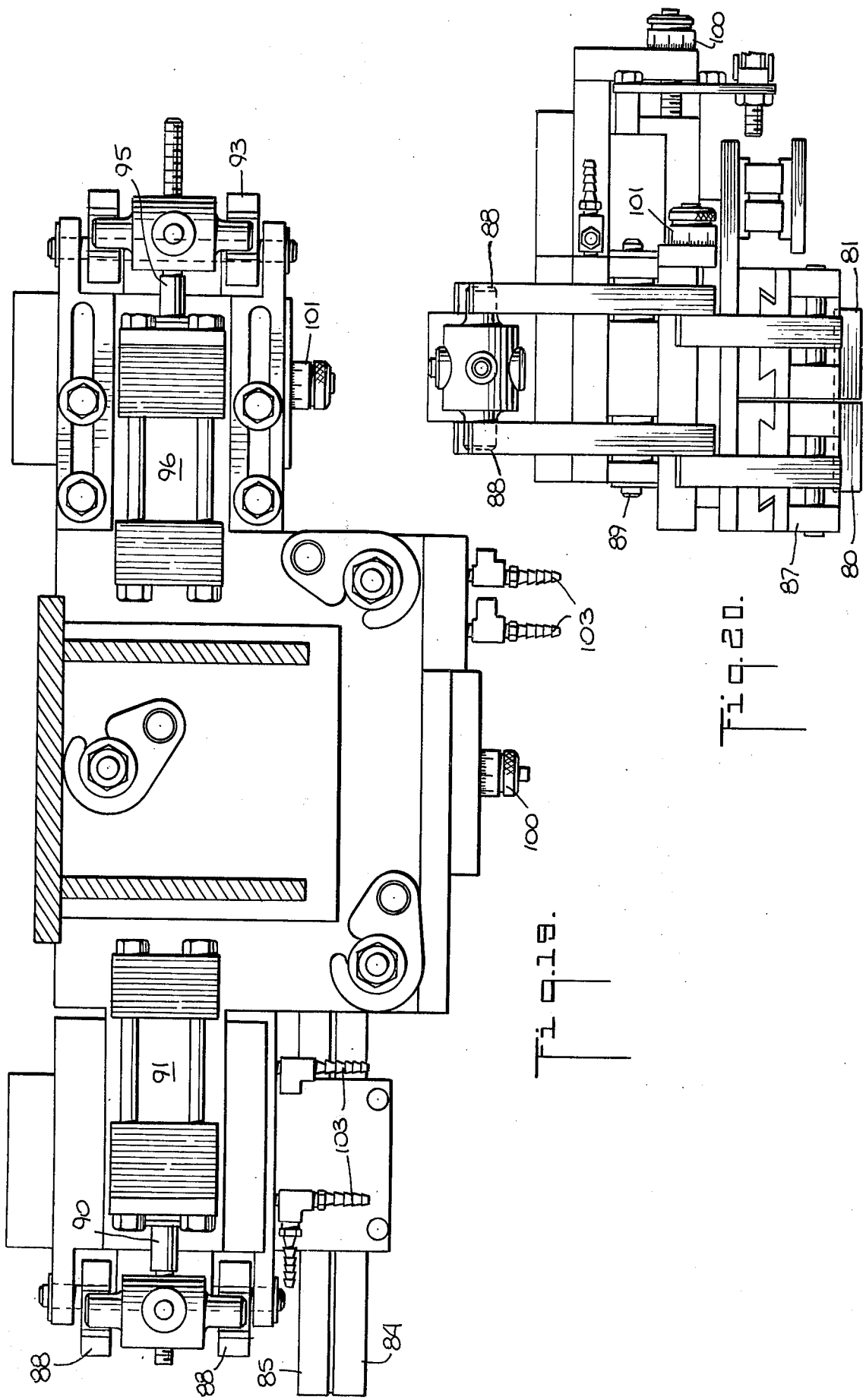

METHOD AND APPARATUS FOR MANUFACTURING WELDED METAL TUBES OF FINITE LENGTH

This invention relates to methods and apparatus for manufacturing welded metal tubes of finite length and such methods and apparatus are particularlay useful in the manufacture of cylindrical tubes which are to be formed subsequently into automobile wheel rims.

It is known in the art that cylindrical tubes can be manufactured by shaping a sheet of metal, such as steel, into an almost complete, split tube having abutting edge faces and thereafter, welding the so-formed tube at its abutting edge faces by various welding methods including gas, arc, contact resistance and high frequency resistance methods. Generally, the width of the sheet of metal is equal to the axial length of the final tube and the length of the sheet of metal is substantially equal to the circumference of the final tube. When such welded tube is to be used for an automobile wheel rim, it is thereafter shaped in a known manner.

For certain uses, such as for an automobile wheel rim, it is important that the weld produced be uniform and of high strength. Furthermore, it will be noted that with the method described, the tubes are welded on an intermittent basis, i.e., an almost complete, split, unwelded tube is inserted into the welding apparatus where it is welded and after one such tube is welded, it is removed and then the next unwelded tube is inserted in the welding apparatus.

With most of said methods of welding, the welding time is relatively long and relatively large amounts of spume, smoke, sparks, etc. are produced, making the working conditions, including physical and fire hazards, unsatisfactory or requiring substantial safety and exhaust equipment.

In addition, with most of said methods of welding, the location of the line of the abutting edges with respect to the welding head or heads is not especially critical, and with most of said methods, a substantial amount of flash, upset, or excess metal, which must be removed subsequently, is produced at the weld area.

Static butt welding of the type described in U.S. Pat. No. 3,591,757, in which high frequency electrical current flows in one direction along the abutting tube edges and flows in the opposite direction in a proximity conductor extending in spaced relation to the abutting tube edges has been found to be well-suited for welding together the abutting tube edges and to eliminate many of the problems of other prior art welding methods. For examples, there is little, if any, smoke, spume, or sparks and a weld along the entire lengths of the abutting edges can be produced very rapidly, as compared to other methods, with little, if any, flash and with only small amounts of upset or protruding metal.

The weld seam produced in said U.S. Pat. No. 3,591,757 also produces a weld which is uniform and of high strength provided that the abutting edges are precisely located with respect to the proximity conductor during the flow of welding current. However, it will be noted that in such methods the path and distribution of the current in the metal at the abutting edges is controlled by several factors, including the relative positions of the proximity conductor and the abutting edges. Accordingly, if the abutting edges are not properly located, within fairly close limits, with respect to the proximity conductor, the amount of current flowing in the metal at the respective edges and its distribution between the edges is different from the desired amount and distribution, causing undesired relative heating and welding temperatures at the two edges. Thus, if the edges are improperly positioned, one edge may be heated insufficiently for accomplishing a uniform, high strength weld and the other edge may be upset by an undesirable amount. If both edge portions are forced toward each other during the forging thereof after heating to welding temperture, the plane of the abutting edge faces should intersect the longitudinal axis of the proximity conductor. However, it has been found that if one edge portion is held in a fixed position and the other edge portion is forced toward said one edge portion, as in the emobdiment hereinafter described, then, the plane of the abutting edge faces preferably should be displaced with respect to the axis of the proximity conductor on the same side thereof as said other edge portion i.e., so that more of the proximity conductor is over the fixed edge portion than over the movable edge portion.

Of course, it will also be apparent that in order to produce a good weld without surface or end protrusions, the abutting faces of the edges should be aligned both radially and axially of the tube during the welding thereof.

Experiments with methods and apparatus in which the edge faces of the shaped, unwelded tube are placed in the desired welding engagement prior to being inserted in welding apparatus of the type disclosed in said U.S. Pat. No. 3,591,757, have shown that even when substantial efforts are made to hold such faces in engagement during the inserting of the unwelded tube into such apparatus and to align the plane of the proximity conductor, difficulties are encountered in obtaining the desired weld due to unintentional misalignment of said faces with said axis of the proximity conductor. Furthermore, such efforts slow down the manufacturing process, and even if the feeding apparatus is initially adjusted so that proper welds are produced for a period of time after such adjustment, normal wear, vibration, and/or movement of the feeding and other apparatus is such that the quality of the welds decreases with time.

We have discovered that the aforesaid problems can be substantially eliminated by maintaining the edge faces in spaced apart, axially aligned relation while they are conveyed into the welding appartus, by moving one of said faces against a stop which is accurately aligned with the proximity conductor after the unwelded tube has been axially positioned in the welding appartus, by thereafter clamping the portion of the unwelded tube having said one face in its position determined by said stop, by thereafter removing said stop and pressing the other edge face against and in radial alignment with said one face and maintaining said edge faces in said relation during the flow of welding current. Preferably, such edge faces are so maintained during the flow of welding current by clamping them so that they cannot displace in the radial direction and by applying pressure to the tube urging said faces toward each other. Preferably, also, said pressure is increased after the metal at said edge faes reaches forge welding temperature to produce a forge weld between said faces.

The preferred embodiment of the invention comprises loading apparatus in combination with welding apparatus of the type disclosed in said U.S. Pat. No. 3,591,757, which has, as part thereof, novel edge face positioning and tube clamping apparatus. The preferred embodiment of the loading apparatus, to which an unwelded tube may be fed manually or automatically, comprises a carriage for the unwelded tube having stop means for engaging the edge faces and holding them apart by a distance greater than normal, in the absence of the stop means, against the normal pressure applied by the resiliency of the tube in a direction causing them to move together. The carriage also has clamps for engaging axially opposite ends of the unwelded tube and axially aligning the edge faces, and the carriage is movable in a direction axially of the tube, both toward and away from said positioning apparatus. The carriage also carries a retractable arm, or arms, which is engageable with a welded tube in the positioning apparatus for discharging a welded tube therefrom as the carriage moves an unwelded tube into the positioning apparatus and thereby moving said welded tube to succeeding conveying or processing apparatus.

The positioning apparatus comprises a retractable stop having an axially and radially extending face which is accurately aligned with a proximity conductor, which, along with its associated devices, may be raised and lowered with respect to the tube. The positioning apparatus also comprises a segmented, clam-shell clamp arranged to substantially surround the tube and to apply the various clamping and forging pressures.

The welding apparatus comprises, in addition to the proximity conductor, retractable contacts for engaging the tube end surfaces adjacent the edge faces and the customary electrical leads and cooling connections for supplying cooling fluid to the contacts, etc.

One object of the invention is to provide methods and apparatus for accurately positioning the edge faces of metal parts to be welded together.

Another object of the invention is to provide methods and apparatus for rapidly welding together the edge faces of metal parts with a uniform, high strength weld.

Other objects and advantages of the invention will be apparent from the following description of a preferred embodiment of the invention, which description should be considered in conjunction with the accompanying drawings in which:

FIG. 1 is a perspective view of a sheet of metal which has been formed into tubular shape and illustrates one type of metal member which may be welded with the apparatus of the invention;

FIG. 2 is a simplified perspective view of the apparatus of the invention;

FIG. 3 is a fragmentary, perspective view similar to FIG. 2 but showing the parts in different relative positions;

FIG. 7 is a simplified, front elevation view of a portion of the apparatus of the invention with some of the parts removed for ease in illustration;

FIG. 8 is an enlarged, plan view of a portion of the apparatus shown in FIG. 7;

FIG. 9 is an enlarged, front elevation view of a portion of the apparatus shown in FIG. 8;

FIG. 14 is a fragmentary, side elevation view of a portion of the loading appartus illustrated in FIG. 7;

FIG. 15 is a fragmentary, end elevation view, partly in cross-section, of the apparatus shown in FIG. 14;

FIG. 16 is a simplified, end elevation view, partly in cross-section, of a portion of the apparatus shown in FIG. 7 and is taken along the line 16—16 indicated in FIG. 7;

FIG. 17 is a fragmentary, front elevation view of a portion of the welding apparatus shown in the preceding figures;

FIG. 18 is a fragmentary, plan view of a portion of the apparatus shown in FIG. 17, and is taken along the line 18—18 indicated in FIG. 17;

FIG. 19 is a fragmentary, plan view of a portion of the apparatus shown in FIG. 17; and FIG. 20 is a fragmentary, end elevation view of the apparatus shown in FIG. 19.

Figure 6:
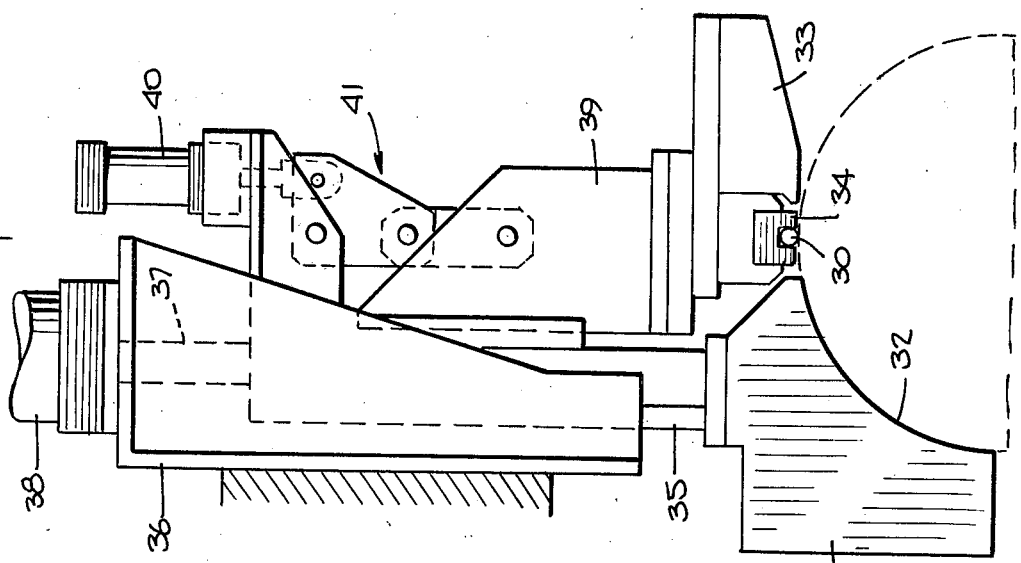
FIG. 6 is a view similar to FIGS. 4 and 5 showing the positions of the clamping device and the welding head during the welding of a tube.

Referring first to FIGS. 1–6 which illustrate the principles of the invention, FIG. 1 shows an unwelded or split tube 1 which has been formed by bending a metal sheet into tubular shape in a well-known manner. The unwelded tube 1 has an inner major surface 2, an outer major surface 3, a pair of end faces 4 and 5 and a pair of edge faces 6 and 7 along which the line of weld is to be produced. The metal of the unwelded tube 1 may be any one of severl metals, such as, steel, aluminum, etc., which may be welded with the welding apparatus employed. The edge faces 6 and 7 are shown in FIG. 1 in slightly spaced relationship, but, if desired, they may be in abutting relationship.

Although the invention will be described in connection with the welding together of the edge portions of a metal sheet 1 formed into tubular shape, it will be understood by those skilled in the art that while differently shaped holding or pressure applying devices may be required, the principles of the invention may be applied to the welding of edge portions of other metal members, such as, a pair of separate metal sheets which may be flat, curved, or arcuate.

With reference to FIG. 2, the preferred embodiment of the apparatus of the invention comprises a loading station 8 and a welding station 9. The stations 8 and 9 are interconnected by a mandrel 10 which, at the loading station 8, comprises a fixed support block 11 at the sides of which are two guide plates 12 and 13. The unwelded tube 1 is inserted over the mandrel 10 at the left end, as viewed in FIG. 2, by expanding the unwelded tube 1 and spreading the edge faces 6 and 7 apart until they fit over the guide plates 12 and 13 in the manner shown at the left in FIG. 2. After the unwelded tube 1 is so positioned, it is gripped at its end faces by arms or clamps, hereinafter described, which are mounted on a carriage, also hereinafter described, having a path of movement parallel to the length of the mandrel 10, and hence, parallel to the axis of the unwelded tube 1. The unwelded tube 1 is then conveyed by the carriage to the right, as viewed in FIG. 2 and as indicated by the arrow 28 in FIG. 1, and the edge faces 6 and 7 then engage a pair of guide plates 14 and 15 along which they slide until the unwelded tube 1 reaches the position shown on the right in FIG. 2.

The mandrel 10 supports a fixed, first or rear support 16 having an upper supporting surface formed by the surface 17 and the surface 18 of a bar 19 of heat resistant insulating materials, such as a ceramic, silicon nitride, etc. The mandrel 10 also supports a movable second, or front, support 20 which is urged upwardly, as viewed in FIG. 2, by spring means into the first position shown in FIG. 2. The support 20 may be moved downwardly to the second position shown in FIG. 3. The support 20 has an upper supporting surface, similar to that of the support 16, formed by the surface 21 and the surface 22 of a bar 23 similar to the bar 19. Although the surfaces 17 and 21 are shown as flat surfaces, for the welding of tubes, the surfaces 17 and 21 may have a radius of curvature equal, or substantially equal, to the radius of the inner surface 2 of the tube 1, or, in other words, so that the shape of the surfaces 17 and 21 will mate closely with the lower surfaces of the edge portions to be welded. The surfaces 17 and 18 are substantially parallel to the surfaces 21 and 22, and when the support 20 is in the position shown in FIG. 3, the flat surfaces 17, 18, 21 and 22 lie substantially in a single curved plane. If the surfaces 17, 18, 21 and 22 are arcuate, the surfaces 17 and 18 will not be exactly parallel to the surfaces 21 and 22 and, therefore, the expression "generally parallel" surfaces will be used to designate both parallel flat surfaces and arcuate surfaces which lie substantially in the same curved plane or a pair of concentric curved planes.

Although the surfaces 17, 18, 21 and 22 may, under some conditions, have lengths in the direction of the axis of the tube 1 which are substantially equal to the axial length of the tube 1, it is preferred that they be shorter, as shown in FIG. 2, so that U-shaped laminations 26 and 27 of magnetic steel may be mounted on the mandrel 10 beneath the opposite ends of the tube 1 adjacent to the edge faces 6 and 7. Such laminations 26 and 27 aid in maintaining the proper current distribution at the ends of the edge faces 6 and 7 in the manner described in said U.S. Pat. No. 3,591,757.

The support 20 has a side surface 24 which is adjacent to the support 16 and which extends transversely to an extension of the surfaces 17 and 18 when the support 20 is in the position shown in FIG. 2. Such side surface 24 also extends substantially parallel to the longitudinal axis of a proximity conductor 30 and in the embodiment shown, to the axis of the tube 1. The plane of the surface 24 intersects the proximity conductor 30 when the latter is in its position in which heating current is supplied to the edge portions of the tube 1 at opposite ends of the abutting edge faces 6 and 7. The relationship of the plane of the surface 24 to the longitudinal axis of the proximity conductor 30 depends upon the relative current distribution desired in the edge portions, i.e., whether equal or unequal currents are desired. For example, in the preferred embodiment described herein, it has been found that the best weld is obtained by having a greater amount of current flowing in the edge portion adjacent the edge face 7 than in the edge portion adjacent the edge face 6. Since the edge portion adjacent the edge face 7 is supported by the surface 18, the proximity conductor 30 is displaced with respect to the surface 24 so that when the parts are in their welding positions shown in FIG. 3, a vertical plane passing through the longitudinal axis of the proximity conductor 30 is displaced to the left, as viewed in FIGS. 2 and 3, with respect to the plane of the surface 24. Experiments have indicated that with steel of the type used for automobile wheel rims and having a thickness of 0.140 inches, and using a welding current having a frequency of 10 kilohertz and having a magnitude sufficient to heat the edge portions to the desired forge welding temperature in 1.5 seconds, the mangitude of the displacement should be about 0.035 inches.

When the unwelded tube 1 has been positioned at the welding station 9, as shown in FIG. 2, the edge face 7 is against the side surface 24 which acts as a positioning stop for the edge face 7, and at least a portion of the edge face 6 is against a side surface of a guide plate 25 on the support 20. Due to the resilience of the tube 1 which urges the edge faces 6 and 7 toward each other, the edge face 7 presses firmly against the side surface 24. A segment 31 of clamshell type clamping apparatus is pressed vertically downwardly and the curved inner surface 32 thereof, having a radius of curvature substantially equal to the radius of the outer surface 3 of the tube 1, engages the outer surface 3 and presses the opposite inner surface 2 against the supporting surfaces 17 and 18 with relatively high pressure. Accordingly, the portion of the unwelded tube 1 adjacent to the edge face 7 is clamped between the segment 31 and the surfaces 17 and 18 of the support 16 with the edge face 7 accurately positioned with respect to the proximity conductor 30.

At this point in the operations, the segment 33 which carries the proximity conductor 30 is lowered and by means associated therewith and hereinafter described, the support 20 is moved downwardly to the position shown in FIG. 3 before the lower surface of the segment 33 reaches a spacing with respect to the surfaces 21 and 22, which is equal to, or slightly greater than, the thickness of the wall of the tube 1. As the support 20 is moved downwardly the edge face 6 is released by the guide plate 25 and rides over the upper surface of the support 20 due both to the natural tendency of the tube 1 to return to the shape shown in FIG. 3, and to pressure applied to the tube 1 by another segment of the clamshell apparatus hereinafter described. The lower surface of the segment 33 guides the portion of the tube 1 adjacent to the edge face 6 as it moves toward the edge face 7, and when the edge faces 6 and 7 abut, the lower surface of the segment 33 firmly holds a portion of the tube 1 between itself and the surfaces 21 and 22, as shown in FIG. 3. The proximity conductor has U-shaped laminations 34 of magnetic steel extending partly therearound for the reasons explained in said U.S. Pat. No. 3,591,757, and the lower surfaces of the laminations 34 also engage the tube 1 at the portions of the outer surface 3 opposite from the bars 19 and 23.

Electrical current is then supplied to the edge portions, and they are forge welded together as described hereinafter. The clamping segments are returned to their release positions and the welded tube 1 is ejected from the welding station 9 as the loading carriage supplies the next unwelded tube 1 to the loading station in the manner described.

Figure 5:
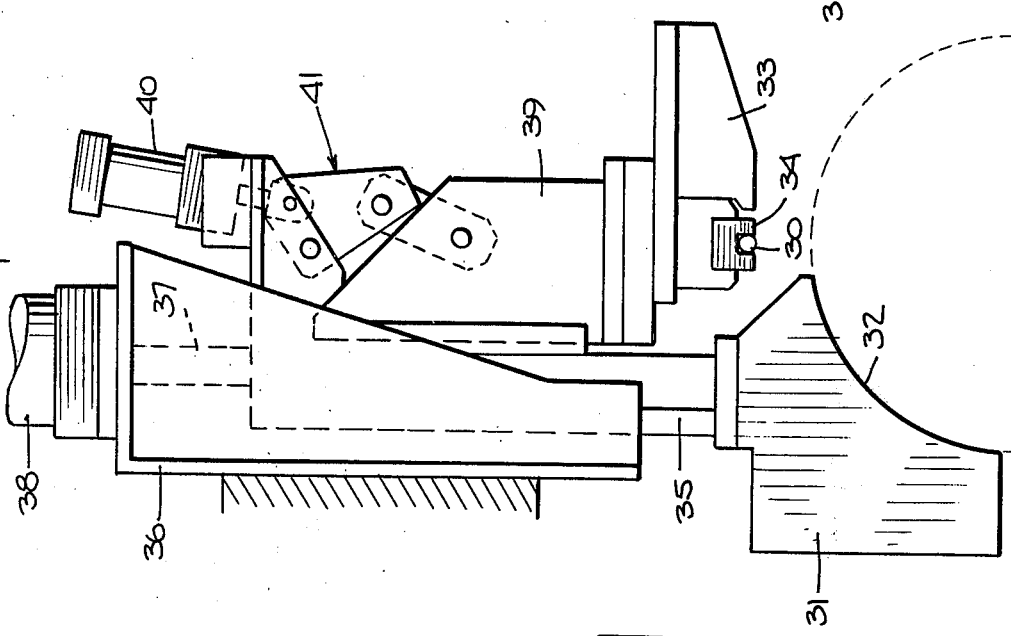
FIG. 5 is a view similar to FIG. 4 illustrating the positions of the clamping device and the welding head after a tube to be welded has been inserted in the welding appartus.
Figure 4:
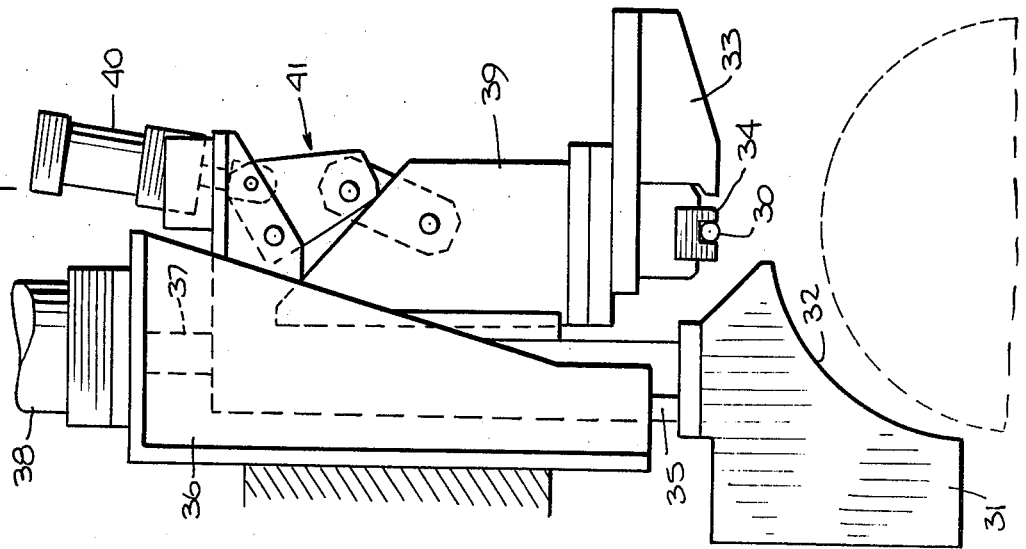
FIG. 4 is a fragmentary, end elevation view, partly in cross-section, illustrating the positions of the clamping device and the welding head during the insertion of a tube to be welded into the welding apparatus.

As shown in FIGS. 4 and 6, the segments 31 and 33 are mounted on a slide 35 on a fixed support 36, and the slide 35 is movable up and down by the rod 37 of a hydraulic piston and cylinder assembly 38. The segment 33 is mounted on a further slide 39 which is slidably mounted on the slide 35 and which is movable up and down by a hydraulic piston and cylinder assembly 40 pivotally mounted on the slide 35 and connected to the slide 39 by a toggle linkage 41. FIG. 4 shows the release positions of the segments 31 and 33, FIG. 5 shows their positions when the segment 31 has clamped the unwelded tube 1 against the surfaces 17 and 18 and FIG. 6 shows their positions during the welding of the edge portions of the tube 1.

With reference to FIG. 7, the loading station 8 comprises a pair of stops 45 and 46 which are movable by the piston and cylinder assemblies 47 and 48 into and out of the positions shown in FIG. 7. The stops 45 and 46 are moved into the position shown in FIG. 7 prior to the loading of the tube 1 on the carriage, designated generally by the reference numeral 49, so as to engage the end face 4 of the tube 1 and thereby properly axially align the edge faces 6 and 7 of the tube 1. After the tube 1 has been clamped on the carriage, as described hereinafter, the stops 45 and 46 are moved away from the end of the tube 1 so that it may be conveyed to the welding station 9 by the carriage 49.

With reference to FIGS. 7, 14 and 15, the carriage 49 comprises a main body portion 50 which is slidable on a supporting and guide shaft 51 in the direction of the axis of the shaft 51. The carriage 49 is driven along such shaft 51 by means of a reversible drive screw 52, which may be rotated in any well-known manner, such as by a hydraulic motor (not shown). Thus, when the drive screw 52 is turned in one direction the carriage 49 moves from the position shown in FIG. 7 to the left until the edge portions of the tube 1 are in the positions in the welding station 9 heretofore described. When the tube 1 is so positioned in the welding station 9 and has been released from the carriage 49, the drive screw 52 may be rotated in the opposite direction to return the carriage 49 to the position shown in FIG. 7.

The carriage 49 also comprises a hydraulically operable guiding arm 54 (FIGS. 7 and 14) and a pair of hydraulically operable clampings arms 55 and 56 (FIG. 14). The guiding arm 54 is shown in its release position in FIG. 7 and in its tube engaging position in FIG. 14. The release position of the clamping arms 55 and 56 is shown in full lines in FIG. 14 and the tube clamping position thereof is shown in dot-dash lines in FIG. 14.

The clamping arms 55 and 56 are pivotally mounted on the carriage 49 and are operable by hydraulic piston and cylinder assemblies 59 and 60. Therefore, after the unwelded tube 1 has been positioned against the stops 45 and 46 as shown in FIG. 7, the clamping arms 55 and 56 are moved by assemblies 59 and 60 to the positions shown in dot-dash lines in FIG. 14 so that they engage the axially opposite faces 4 and 5 of the tube 1 and hold the tube 1 on the carriage 49.

The guiding arm 54 is for the purpose of resisting tilting of the tube 1 as it is moved from the loading station 8 to the welding station 9. While the tube 1 is being loaded on the carriage 49, the arm 54 is in the position shown in FIG. 7, and after the tube 1 has been loaded on the carriage 49, the arm 54 is moved to the position shown in FIG. 14 by the piston and cylinder assembly 58 so that it engages, or is immediately adjacent, a portion of the end face 5 diametrically opposite from the portion thereof engaged by the arm 56. If the tube 1 tends to tilt as it is moved by the carriage 49, such tilting will be limited by the arm 54.

The carriage 49 also carries an ejection arm 65 which is pivotally mounted on the carriage and biased to the position shown in full lines in FIG. 14 by a spring 66. Thus, the ejection arm 65 is normally maintained in the position shown in full lines in FIG. 14, but is movable against the force of the spring 66 to the position shown in dotted lines in FIG. 14. The purpose of the ejection arm 65 is to engage a previously welded tube in the welding station 9 and eject such previously welded tube from the welding station as a succeeding unwelded tube 1 is moved by the carriage 49 to the welding station 9. However, when the carrriage 49 is returned to the loading station 8, the arm 65 can pass beneath an unwelded tube 1.

Figure 10:
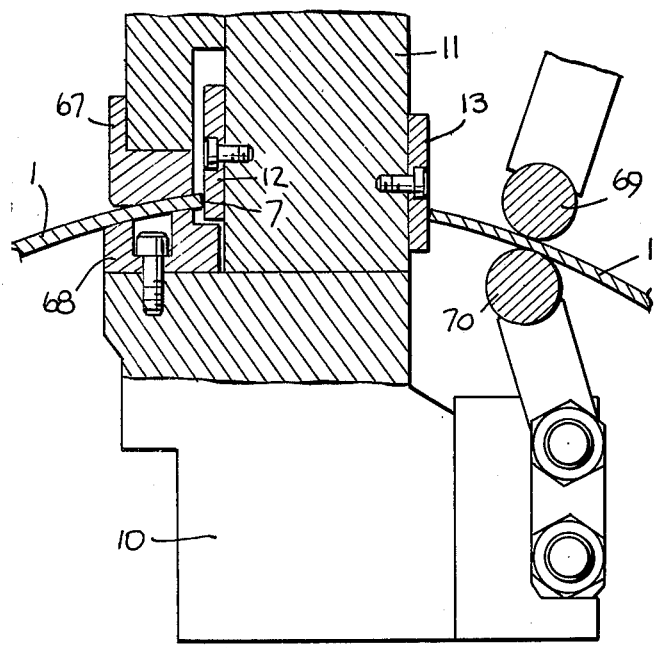
FIG. 10 is a fragmentary, cross-sectional, end elevation view of apparatus shown in FIG. 7, and is taken along the line 10—10 indicated in FIG. 7.

FIG. 10 illustrates further details of the positioning of the tube 1 at the loading station. The support block 11 has upper and lower supports 67 and 68 adjacent one side thereof and spaced apart a distance sufficient to receive an edge portion of the tube 1 therebetween with the edge face 7 of the tube 1 against the guide plate 12. At the opposite side of the support block 11, the other edge portion of the tube 1 is supported by a pair of rods 69 and 70, both rods 69 and 70 being adjustable toward and away from the tube 1. The rods 69 and 70 are otherwise fixed in position so that the edge portion of the tube slides therebetween as the carriage 49 moves the tube 1 to the welding station 9.

Figure 11:
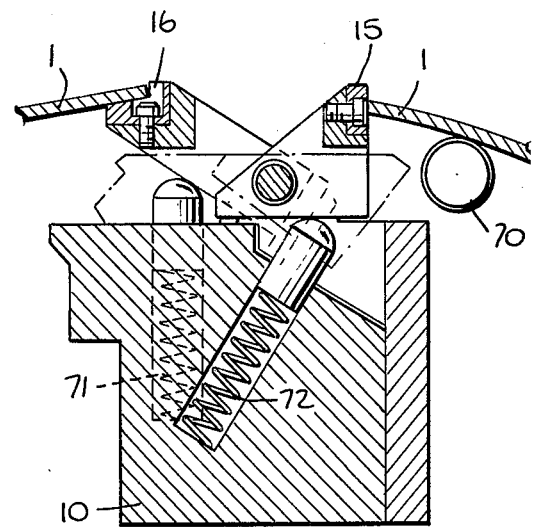
FIG. 11 is a fragmentary, cross-sectional, end elevation view of a portion of apparatus shown in FIG. 7, and is taken along the line 11—11 indicated in FIG. 7.

FIG. 11 illustrates further details of the mounting of the guide plates 15 and 16 which are intermediate the loading station 8 and the welding station 9. As shown in FIG. 11, the guide plates 15 and 16 are pivotally mounted but are prevented from moving nearer to each other than the amount shown in FIG. 11. The mountings for the guide plates 15 and 16 are urged by springs 71 and 72 into the position shown in FIG. 11, but such mountings for the guide plates 15 and 16 may be rotated clockwise and counterclockwise, respectively, against the force of the springs 71 and 72 to permit them to move downwardly when the welding head, hereinafter described, moves into welding position.

Figure 12:
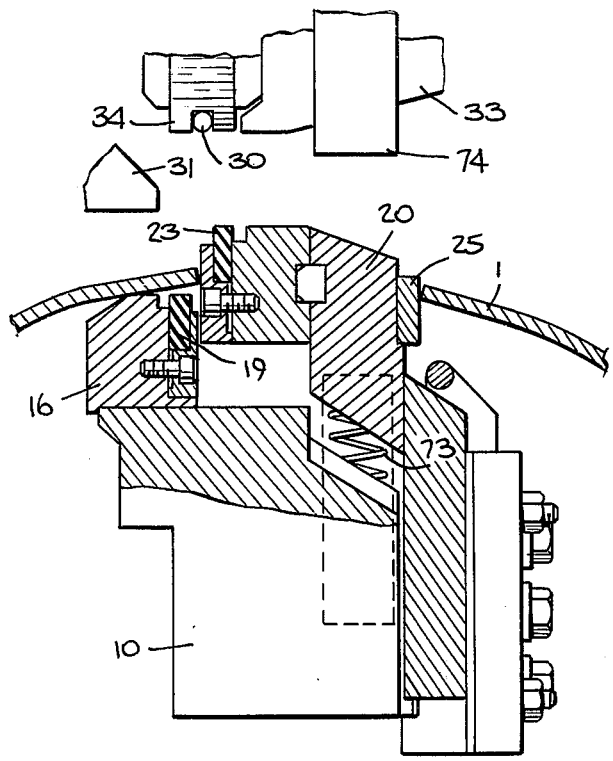
FIG. 12 is a fragmentary, cross-sectional, end elevation view of a portion of apparatus shown in FIG. 7 and is taken along the line 12—12 indicated in FIG. 7.

FIG. 12 shows further details of the apparatus at the welding station 9 which is immediately adjacent the edge portions of the tube 1. As illustrated in FIG. 12, the support 20 is urged into the position shown in FIG. 12 by a spring 73, and the slide 35, which carries the segment 33, has a part 74 which extends below the lower surface of the segment 33 and which is beyond the end face 4 of the tube 1, and as the slide 35 is lowered such part 74 engages the support 20 before the segment 33 engages the tube 1 and moves the support 20 to the position shown in FIG. 13 as the segment 33 is moved downwardly by the slide 35, as described hereinbefore.

Figure 13:
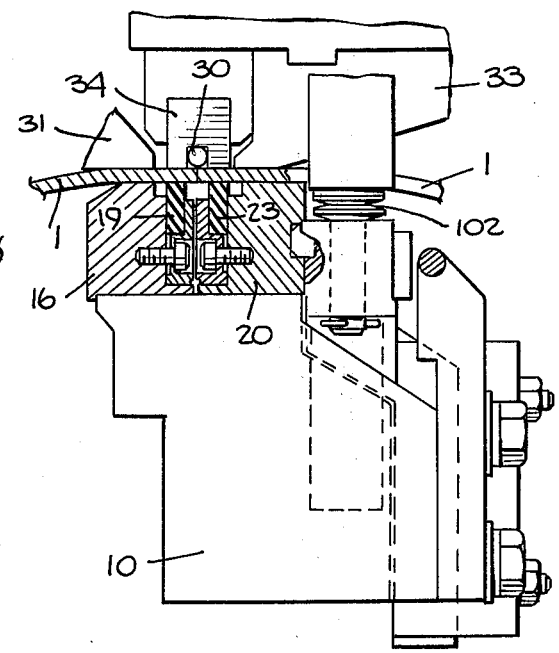
FIG. 13 is a fragmentary, cross-sectional, end elevation view similar to FIG. 12 showing the welding apparatus in the positions thereof in which welding is performed.

FIG. 13 illustrates the arrangement of the parts immediately adjacent the edge portions of the tube 1 to be welded, during the time that electrical heating current is supplied to the edge portions for the purpose of heating them to the desired forge welding temperature.

FIG. 16 shows, in addition to some of the parts illustrated in earlier figures, further segments of the clamshell type clamping apparatus. Thus, the clam-shell type apparatus comprises a pair of pivotally mounted segments 75 and 76, such segments 75 and 76 being pivotable about a shaft 77. The segments 75 and 76 may be moved toward each other, in an obvious manner, by a hydraulic piston and cylinder assembly 78. As mentioned hereinbefore, the edge face 6 is moved toward the edge face 7 at the welding station 9 as the support 20 is moved downwardly, and such movement is caused, in part, by the segment 76. Preferably, during the time that the heating current is flowing in the edge portions, the segments 75 and 76 apply pressure to the tube 1 sufficient only to maintain the edge face 6 firmly against the edge face 7, and after the edge portions of the tube 1 have reached forge welding temperature, additional pressure is applied to the tube 1 by the segments 75 and 76 to produce forge welding of the edge portions of the tube 1.

FIGS. 17–20 illustrate, in simplified form, the mechanical and electrical components of the welding head. The slide 35, which carries the proximity conductor 30, its associated laminations 34 and the segment 33, also carries two pairs of electrical contacts 80, 81 and 82, 83, which are slidably mounted so as to be movable toward and away from each other, and hence, toward and away from the end faces 4 and 5 of the tube 1 at portions thereof on opposite sides of the abutting edge faces 6 and 7. The contacts 82 and 83 are connected to one end of the proximity conductor 30 by a flexible copper strap 84, and the contacts 80 and 81 are connected to one terminal of a high frequency, electrical current source of the type described in said U.S. Pat. No. 3,591,757, through an electrical conductor or lead 85. The end of the proximity conductor 30 opposite to that end to which the contacts 82 and 83 are connected is connected to the other electrical conductor or lead 86, which, in turn, connects to the other terminal of the high frequency electrical current source.

The contacts 80 and 81 are mounted on a slide 87 which is pivotally connected to one end of a lever 88, which is pivotally mounted from the slide 35 at 89. The opposite end of the lever 88 is pivotally connected to the piston rod 90 of a hydraulic piston and cylinder assembly 91. Similarly, the contacts 82 and 83 are mounted on a slide 92 which is pivotally connected to one end of a lever 93 pivotally mounted on the slide 35 at 94, and pivotally connected at its opposite end to the piston rod 95 of a hydraulic piston and cylinder assembly 96.

During the time that an unwelded tube 1 is being loaded into the welding station 9, the slide 35 is raised as described hereinbefore, and the piston and cylinder assemblies 91 and 96 are actuated so that the contacts 80 and 81 are moved away from the contacts 82 and 83. After the unwelded tube has been properly positioned in the welding apparatus, as described hereinbefore, and the tube 1 has been clamped in position, the piston and cylinder assemblies 91 and 96 are actuated so as to move the contacts 80 and 81 toward the contacts 82 and 83 and so as to engage the respective end faces 4 and 5 with the contacts 80 and 82 on one side of the abutting edge faces 6 and 7 and with the contacts 81 and 83 on the opposite side of the abutting edge faces 6 and 7. Thereafter, the electrical heating current is supplied to the contacts through the conductors 85 and 86, which causes the current to flow in a first direction in the edge portions of the tube 1 adjacent the abutting edge faces 6 and 7 and while the current flows in the opposite direction in the proximity conductor 30. The frequency of the heating current is selected as described in said U.S. Pat. No. 3,591,757, and, preferably, the frequency of the heating current is such as to provide a reference depth in the metal of the tube 1 at least equal to the radial thickness of the edge faces 6 and 7. The heating current is supplied for a time sufficient to heat the edge portions at the edge faces 6 and 7 to a forge welding temperature, and it has been found that with suitable selection of frequency and current magnitude, the time may be as short as 1.5 seconds.

Of course, the various components may include conventional mechanical controls for the adjustment of the positions thereof, such as the controls 100 and 101 in FIGS. 17, 19 and 20 and the control 102 in FIGS. 9 and 13. In addition, the various conventional fluid connectors for hydraulic and cooling fluids, such as the connectors 103 and 104 (FIGS. 17 and 19), will also be provided.

Although the various actuating mechanisms, such as the motor for rotating the drive screw 52, and the various piston and cylinder assemblies, may be manually controlled, preferably, they are automatically controlled in proper sequence by control apparatus of a type well-known in the art. Assuming that all the various parts are in their release positions in which the welding and loading apparatus is ready to receive an unwelded tube, one preferred sequence of operations is as follows:

1. Piston and cylinder assemblies 47 and 48 (FIG. 7) are actuated to move the stops 45 and 46 into the positions shown in FIG. 7 and an unwelded tube 1 is mounted on the carriage 49, manually or automatically, as described, with the end face 4 abutting the stops 45 and 46 and the edge faces 6 and 7 abutting the guide plates 13 and 12.
2. Piston and cylinder assemblies 59 and 60 (FIG. 14) are actuated causing the arms 55 and 56 to clamp the tube 1 on the carriage 49 and the piston and cylinder assembly 58 is actuated to move the arm 54 into the position shown in FIG. 14.
3. Piston and cylinder assemblies 47 and 48 (FIG. 7) are oppositely actuated withdrawing the stops 45 and 46.
4. The motor which rotates the drive screw 52 (FIG. 7) is energized, moving the tube 1 into the welding station 9 as described.
5. Piston and cylinder assembly 38 (FIG. 4) is actuated causing the segment 31 to clamp the portion of the tube 1 adjacent the edge face 7 against the surfaces 17 and 18 (FIG. 2).
6. Piston and cylinder assemblies 58, 59 and 60 (FIG. 14) are oppositely actuated thereby releasing the tube 1 and moving the arm 54 to its release position, and the motor which rotates the drive screw 52 (FIG. 7) is reversed causing the carriage 49 to return to the loading station 9 and the position shown in FIG. 7.
7. Piston and cylinder assembly 40 (FIG. 4) is actuated causing the segment 33 and the part 74 (FIG. 12) to move downwardly and depress the support 20 which permits the edge face 6 to move toward the edge face 7, the edge face 6 being maintained in axial alignment with edge face 7 by suitable stationary guides (not shown). Shortly after the assembly 40 is actuated the piston and cylinder assembly 78 (FIG. 16) is actuated thereby pressing the edge face 6 against the edge face 7, and meanwhile, the assembly 40 (FIG. 6) restrains the portion of the tube 1 adjacent the edge face 6 between the segment 33 and the laminations 34, on the one hand, and the surfaces 18, 22 and 21 on the other hand.

8. Piston and cylinder assemblies 91 and 96 (FIG. 17) are actuated thereby moving the contacts 80–83 into contact with the end faces 4 and 5 of the tube 1 and electrical heating current is supplied to the contacts 80–83 through the conductors 85 and 86 until the edge portions of the tube 1 reach the desired welding temperature, at which time the current is discontinued 9. The fluid pressure on the piston and cylinder assembly 78 (FIG. 16) is increased causing the edge portions of the tube 1 to be forge welded together.

10. The piston and cylinder assemblies 78, 38 and 40 (FIG. 4) are oppositely actuated thereby returning the various clamping segments 31, 33, 75 and 76 (FIG. 16) to their release positions.

The sequence may then re repeated and when the carriage 49 moves the next unwelded tube 1 into the welding station 9, the ejector arm 65 will eject the previously welded tube from the welding station 9 (to the right in FIG. 2), and the welded tube will normally be received by subsequent processing apparatus positioned at the ejection side of the welding station 9.

Although only a preferred embodiment of the invention has been illustrated and described, it will be understood by those skilled in the art that various modifications may be made without departing from the principles of the invention.

What is claimed is:

1. Apparatus for welding together a pair of metal portions at their edges, each of said portions having an edge face and a major surface adjacent and extending transversely to said edge face, said apparatus comprising a welding station comprising welding means for welding said portions together, said welding means comprising an elongated proximity conductor, means for connecting one end of said proximity conductor to a first portion of each of said metal portions at the edge face thereof, contact means for engaging a second portion of each of said metal portions at the edge face thereof and means for supplying electrical welding current to said contact means and to the other end of said proximity conductor, holding means for receiving, engaging and supporting said portions including means for engaging the edge face of one of said portions and positioning said last-mentioned edge face in predetermined spaced relation to said proximity conductor with said last-mentioned edge face substantially parallel to the length of said proximity conductor and for thereafter holding said last-mentioned edge face in said predetermined relation to said proximity conductor while pressing the edge face of the other of said portions against said edge face of said one portion when the latter is positioned in said predetermined relation, and loading means for engaging said metal portions and delivering said metal portions to said holding means.

2. Apparatus as set forth in claim 1, wherein said holding means comprises a support having a supporting surface and an edge face guide adjacent said support and engageable with said edge face of said one portion, means mounting said guide for movement from a first position in which a surface thereof extends transversely to an extension of said supporting surface to a second position out of the path of said extension, first clamping means for clamping one of said portions adjacent the edge face thereof against said supporting surface with said last-mentioned edge face against said surface of said guide and second clamping means for pressing the edge face of said other portion against said edge face of said one portion when said guide is in said second position.

3. Apparatus as set forth in claim 2, wherein said metal portions are portions of a split tube on opposite sides of the split therein and wherein said second clamping means comprises a pair of segments having concave faces engageable with the outer surface of said tube and means for urging said segments toward each other.

4. Apparatus as set forth in claim 3, wherein said loading means comprises means for holding the edge face of said one portion in spaced relation to the edge face of said other portion and for maintaining said spaced relation during delivery of said portions to said holding means and until said edge face of said one portion is in engagement with said edge face guide.

5. Apparatus for welding together a pair of metal portions at their edges, each of said portions having an edge face and a major surface adjacent and extending transversely to said edge face, said apparatus comprising a welding station and loading means for supplying said metal portions to said station, said welding station comprising first and second supports, each of said supports having a support surface for receiving and engaging said major surface of one of said portions adjacent said edge face thereof and the support surface of one said support being generally parallel to the support surface of the other said support, said one support having a side surface adjacent said other support, means mounting said one support for movement with respect to said other support in first and second opposite directions transverse to said support surface, means for urging said one support in said first direction so that said side surface extends transversely to an extension of the support surface of said other support, first clamping means for clamping one of said metal portions against the support surface of said other support and for positioning said edge face of said last-mentioned one portion against said side surface of said one support, second clamping means for clamping the other of said metal portions against the support surface of said one support and for moving the edge face of said other of said metal portions into engagement with said edge face of said one portion upon movement of said one support in said second direction, and welding means for welding said portions together disposed adjacent to said supports for welding said edge portions together.

6. Apparatus as set forth in claim 5, wherein said welding means comprises contact means engageable with said metal portions at opposite ends of the edge faces thereof and a proximity conductor adjacent said supports and substantially parallel to said side surface.

7. Apparatus as set forth in claim 6, wherein said loading means comprises a carriage movable toward and away from said welding station and means on said carriage for engaging and holding said metal portions with the edge faces thereof in spaced relation.

8. Apparatus for welding together the edge portions of a split metal tube, said tube having inner and outer major surfaces, axially opposite end faces and edge faces on opposite sides of the split therein, said edge portions being at opposite sides of the split in said tube, said apparatus comprising a loading station and a welding station, said loading station comprising a carriage for receiving and carrying said tube and including first clamping means for engaging said tube and holding said tube on said carriage, guide means for engaging each of said edge faces and maintaining the edge face of one said portion in spaced relation to the edge face of the other said portion, means mounting said carriage for movement from said loading station to said welding station, and said welding station comprising a first support having a supporting surface for receiving the inner major surface of said one portion adjacent the edge face thereof, a second support having a side surface adjacent said first support and extending transversely to the supporting surface of said first support, means mounting said second support for movement in first and second opposite directions transverse to the supporting surface thereof and between a first position in which said side surface extends transversely to an extension of the supporting surface of said first support and a second position in which said last-mentioned surface is substantially co-extensive with the supporting surface of said second support, second clamping means engageable with the outer major surface of said tube adjacent said one portion thereof for pressing said tube against said supporting surface of said first support and for holding said edge face of said one portion against said side surface of said second support when it is in said first position, third clamping means engageable with the outer major surface of said tube at a portion thereof spaced from but nearer to the edge face of said other portion than said edge face of said one portion for pressing said tube against said supporting surface of said second support and pressing the edge face of said other portion against the edge face of said one portion when said second support is in said second position, said carriage having a path of movement extending toward said first support and said second support whereby said edge portions are directed over the supporting surfaces of said first support and said second support upon movement of said carriage from said loading station to said welding station and said first clamping means being releasable, and welding means disposed adjacent to said first support and said second support for welding said edge portions together.

9. Apparatus as set forth in claim 8, wherein said welding means comprises a pair of contact means, one of said contact means being engageable with said edge portions at one of said end faces adjacent said edge faces and the other of said contact means being engageable with the other of said end faces adjacent said edge faces, a proximity conductor adjacent said first and second supports and overlying and generally parallel to said side surface, means electrically connecting one end of said proximity conductor to one of said contact means, a source of high frequency electrical current and means electrically connecting said source to the other of said contact means and to the other end of said proximity conductor.

\* \* \* \* \*